(No Model.)
R. T. CRANE.
COMPOSITION DISK VALVE.
No. 600,360. Patented Mar. 8, 1898.
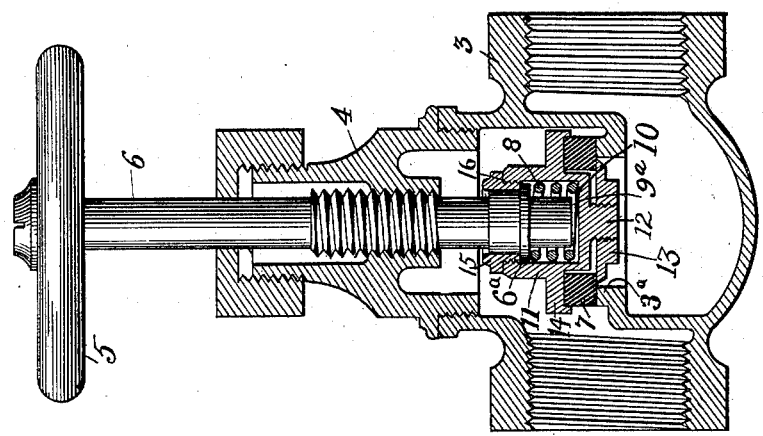
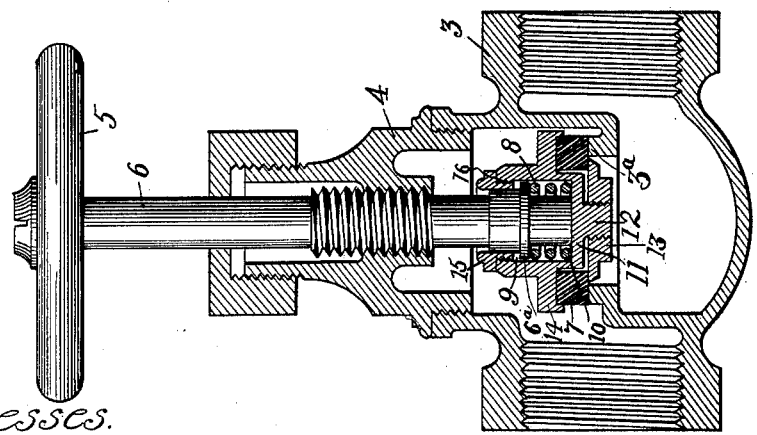
Witnesses.
Wm. M. Rheem
Wm. F. Heming
Inventor.
Richard T. Crane
by atty Paul Synnestvedt

UNITED STATES PATENT OFFICE.

RICHARD T. CRANE, OF CHICAGO, ILLINOIS.

COMPOSITION DISK VALVE.

SPECIFICATION forming part of Letters Patent No. 600,360, dated March 8, 1898.

Application filed June 30, 1897. Serial No. 643,044. (No model.)

*To all whom it may concern:*

Be it known that I, RICHARD T. CRANE, a citizen of the United States, residing in Chicago, Cook county, Illinois, have invented certain new and useful Improvements in Composition Disk Valves, of which the following, taken in connection with the accompanying drawings, is a specification.

In the use of valves of the above class for controlling the flow of heated fluids difficulty has been experienced because of the fact that after being closed the composition in the disk contracts sufficiently from cooling to permit a slight relaxation of the pressure holding the valve shut and a consequent slight reopening or leakage.

One of the objects of my invention is to overcome the above-mentioned difficulty; and this and such other objects as may hereinafter appear I attain by the mechanism defined in the appended claims and illustrated in preferred form in the accompanying drawings, in which—

Figure 1 represents a globe-valve with my invention applied thereto. Fig. 2 represents the same valve with the parts in a somewhat different position.

3 indicates the body portion of the valve, provided with a valve-seat $3^a$.

4 is the valve-bonnet, through which extends a stem 6, provided with a handle 5. The stem 6 is provided near its lower end with an annular flange or collar $6^a$, against which bears the upper end of a coil-spring 8, the lower end of said spring bearing against the base 10 of cylindrical casing 11. A screw 12 depends from the outer side of the base 10 to receive a disk 13, the latter being centrally bored and threaded to fit said screw. The casing 11 is provided with an annular horizontal flange 14, against which is seated the composition ring 7.

A threaded thimble 15 surrounds the stem 6, and it engages the internal threads 16 of the cylindrical casing 11.

The spring 8 is so arranged that it will be compressed a certain amount before the stem begins to bear rigidly against the casing back of the disk 7. The clearance or lost motion by which this is accomplished is indicated at 9.

In Fig. 1 the valve is represented as having just been closed, the stem 6 bearing tightly against the casing back of the disk 7 and holding the latter to its seat.

In Fig. 2 the disk is represented as having been cooled and contracted slightly, this contraction having allowed the casing back of the disk to draw away from the end of the stem 6, leaving the clearance-space $9^a$, but the valve-disk 7 still held tightly to its seat by means of the pressure of the spring 8.

It is obvious that it is immaterial to the spirit of my invention where the spring 8 is located, provided only that it be so placed that it will be interposed between the disk and the backing against which the pressure is exerted which seats the valve. Thus it might be arranged as shown in the drawings, in which it is applied to a valve of the quick opening type interposed between a shoulder 10 upon the stem and the bonnet 4.

Having thus described my invention, what I claim as new, and desire to secure by Letters Patent, is—

1. The combination with the valve body and seat, of a valve comprising a cylindrical casing, a composition disk secured to said casing, a valve-stem extending into said casing to normally bear against the base thereof and provided with an annular collar, and a spring surrounding the lower end of said stem between its collar and the base of said casing.

2. The combination with the valve body and seat, of a cylindrical casing provided with an annular flange, a composition ring 7 secured to said flange, a valve-stem extending into said cylindrical casing and normally bearing against the base thereof and provided with a collar, and a spring surrounding the lower end of the stem between its collar and the base of the casing whereby said spring will act to move the valve-casing away from the stem to keep the valve tightly closed after contraction.

RICHARD T. CRANE.

Witnesses:
L. A. THOMPSON,
PAUL SYNNESTVEDT.